US008024649B1

(12) United States Patent
Morio et al.

(10) Patent No.: US 8,024,649 B1
(45) Date of Patent: Sep. 20, 2011

(54) INFORMATION DISTRIBUTING SYSTEM, INFORMATION PROCESSING TERMINAL DEVICE, INFORMATION CENTER, AND INFORMATION DISTRIBUTING METHOD

(75) Inventors: Minoru Morio, Tokyo (JP); Akira Tange, Tokyo (JP)

(73) Assignee: Sony Corporation, Tokyo (JP)

(*) Notice: Subject to any disclaimer, the term of this patent is extended or adjusted under 35 U.S.C. 154(b) by 850 days.

(21) Appl. No.: 09/181,548

(22) Filed: Oct. 29, 1998

(30) Foreign Application Priority Data

Nov. 5, 1997 (JP) .................................... P9-303151

(51) Int. Cl.
*G06F 15/00* (2006.01)

(52) U.S. Cl. ......................... 715/201; 715/203; 707/610

(58) Field of Classification Search ............... 707/500.1, 707/501.1, 610; 696/6–7; 715/500.1, 501.1, 715/513, 202–205, 234, 201; 369/6–7.1; 704/2–5; 434/157

See application file for complete search history.

(56) References Cited

U.S. PATENT DOCUMENTS

| | | | | | |
|---|---|---|---|---|---|
| 5,046,004 | A | * | 9/1991 | Tsumura et al. | 84/601 |
| 5,250,747 | A | * | 10/1993 | Tsumura | 434/307 A |
| 5,408,686 | A | * | 4/1995 | Mankovitz | 369/47.23 |
| 5,557,541 | A | | 9/1996 | Schulhof et al. | 700/94 |
| 5,572,442 | A | | 11/1996 | Schulhof et al. | 709/219 |
| 5,675,738 | A | | 10/1997 | Suzuki et al. | 709/219 |
| 5,754,501 | A | * | 5/1998 | Tsutsui | 369/124.01 |
| 5,774,798 | A | * | 6/1998 | Gaskill | 455/186.1 |
| 5,787,399 | A | * | 7/1998 | Lee et al. | 704/270 |
| 5,790,423 | A | * | 8/1998 | Lau et al. | 700/94 |
| 5,819,032 | A | * | 10/1998 | de Vries et al. | 709/250 |
| 5,832,472 | A | * | 11/1998 | Sheppard, II | 707/1 |
| 5,841,979 | A | | 11/1998 | Schulhof et al. | 709/237 |
| 5,854,619 | A | * | 12/1998 | Kato | 345/23 |
| 5,890,053 | A | * | 3/1999 | Hino et al. | 455/186.1 |
| 5,914,707 | A | * | 6/1999 | Kono | 345/173 |
| 5,914,941 | A | | 6/1999 | Janky | 370/313 |
| 5,926,624 | A | * | 7/1999 | Katz et al. | 709/217 |
| 5,956,034 | A | * | 9/1999 | Sachs et al. | 715/776 |
| 5,966,440 | A | * | 10/1999 | Hair | 705/26 |
| 5,983,236 | A | * | 11/1999 | Yager et al. | 707/104.1 |

(Continued)

FOREIGN PATENT DOCUMENTS

JP 8-278929 10/1996

(Continued)

OTHER PUBLICATIONS

"Marc Brown Arthur's Reading Race", Interactive Animated Stories Living Books, Broderbund, 1996.*

(Continued)

*Primary Examiner* — Amelia Rutledge

(74) *Attorney, Agent, or Firm* — Oblon, Spivak, McClelland, Maier & Neustadt, L.L.P.

(57) ABSTRACT

An information distributing system for distributing data to at least one information processing terminal device from an information center storing data. The information distributing system is structured such that character data, audio data, and both the character data and the audio data are selectively downloaded from the information center to the information processing terminal device on the basis of request information from the information processing terminal device, so that a user has multiple options for information selection and effective information collection becomes possible.

2 Claims, 10 Drawing Sheets

U.S. PATENT DOCUMENTS

| | | | | |
|---|---|---|---|---|
| 6,088,455 | A * | 7/2000 | Logan et al. | 380/200 |
| 6,173,317 | B1 * | 1/2001 | Chaddha et al. | 709/219 |
| RE37,131 | E * | 4/2001 | Mankovitz | 370/528 |
| 6,230,172 | B1 * | 5/2001 | Purnaveja et al. | 715/512 |
| 6,546,405 | B2 * | 4/2003 | Gupta et al. | 715/512 |
| 2004/0106454 | A1 * | 6/2004 | Walker et al. | 463/42 |

FOREIGN PATENT DOCUMENTS

| | | |
|---|---|---|
| JP | 9-62283 | 3/1997 |
| JP | 6-77992 | 3/2006 |
| JP | 7-79248 | 3/2007 |
| WO | WO96/31057 | 10/1996 |

OTHER PUBLICATIONS

Takehisa Fujita, et al., “An Approach to Library Information based on Multi-Media Systems”. Technical Report of the Information Processing Society of Japan, vol. 91, No. 98, Nov. 19, 1991, pp. 1-8.

Dokukinoko, “Close Up”, DOS/V Power Report, vol. 7, No. 1, Jan. 1, 1997, pp. 260-261.

One Step Communication, Display reading software for Windows 95 which assists a visual impairment “95 Reader”, ASCII Co., Ltd., Feb. 1, 1997, vol. 21 No. 2, p. 452-453.

Akio Shimatani, Voice synthesizer device “Otojiro”, Nikkei Byte, Japanese Nikkei BP, Feb. 1, 1989, No. 55, p. 211-213.

* cited by examiner 403 401 402 400

| ID | CHARACTER DATA | AUDIO DATA |
|---|---|---|
| 0 | A | a |
| 1 | B | b |
| 2 | C | c |
| 3 | D | d |
| ⋮ | ⋮ | ⋮ |

INFORMATION DISTRIBUTING SYSTEM, INFORMATION PROCESSING TERMINAL DEVICE, INFORMATION CENTER, AND INFORMATION DISTRIBUTING METHOD

BACKGROUND

1. Field of the Invention

The present invention relates to an information distributing system in which, for example, information can be distributed from an information center storing information to at least one terminal device, an information processing terminal device which can output distributed information, an information center which distributes information to an information processing terminal device, and an information distributing method.

2. Background of the Invention

As a conventional information distributing system, there is known a communication karaoke system. The communication karaoke system is structured such that audio information and video information of karaoke are stored in a server as a host computer in a database format, and at least one terminal device is connected to the server through a telephone line or the like.

As a distributing method of data, there is known a method in which information is periodically downloaded from the server to a memory portion provided at the side of a terminal device, or a method in which a user operates an operation portion provided at the side of a terminal device to prepare request information of a desired karaoke, the request information is transmitted to a server, and the audio information and video information of the karaoke are downloaded to the terminal device from the server according to the request information.

However, in the communication karaoke system, the information downloaded to the terminal device side is only audio information and video information of karaoke, and video information and audio information corresponding to character information are not separately downloaded from the server to the terminal device side, or video information, character information, audio information, or composite information of those are not selectively downloaded.

SUMMARY OF THE INVENTION

An object of an information distributing system of the present invention is to solve the foregoing problem.

In order to achieve the above object, according to the present invention, in an information distributing system, desired data are downloaded from an information center storing a plurality of data to an information processing terminal device. The information processing terminal device comprises request information generating means for generating request information which requests one of designated character data, designated audio data, and both the designated character data and the audio data from the information center; terminal side communication means for carrying out data communication with the information center; and terminal side communication control means for transmitting the request information generated by the request information generating means to the information center through the terminal side communication means and for receiving data transmitted from the information center. The information center comprises a data base storing various kinds of data; center side communication means for carrying out data communication against the information processing terminal device; and center side communication control means for receiving the request information through the center side communication means and for transmitting one of the designated character data, the designated audio data, and both the designated character data and the audio data to the information processing terminal device.

DESCRIPTION OF THE INVENTION

Preferred embodiments of the present invention will be described in detail with reference to the drawings.

Figure 1:
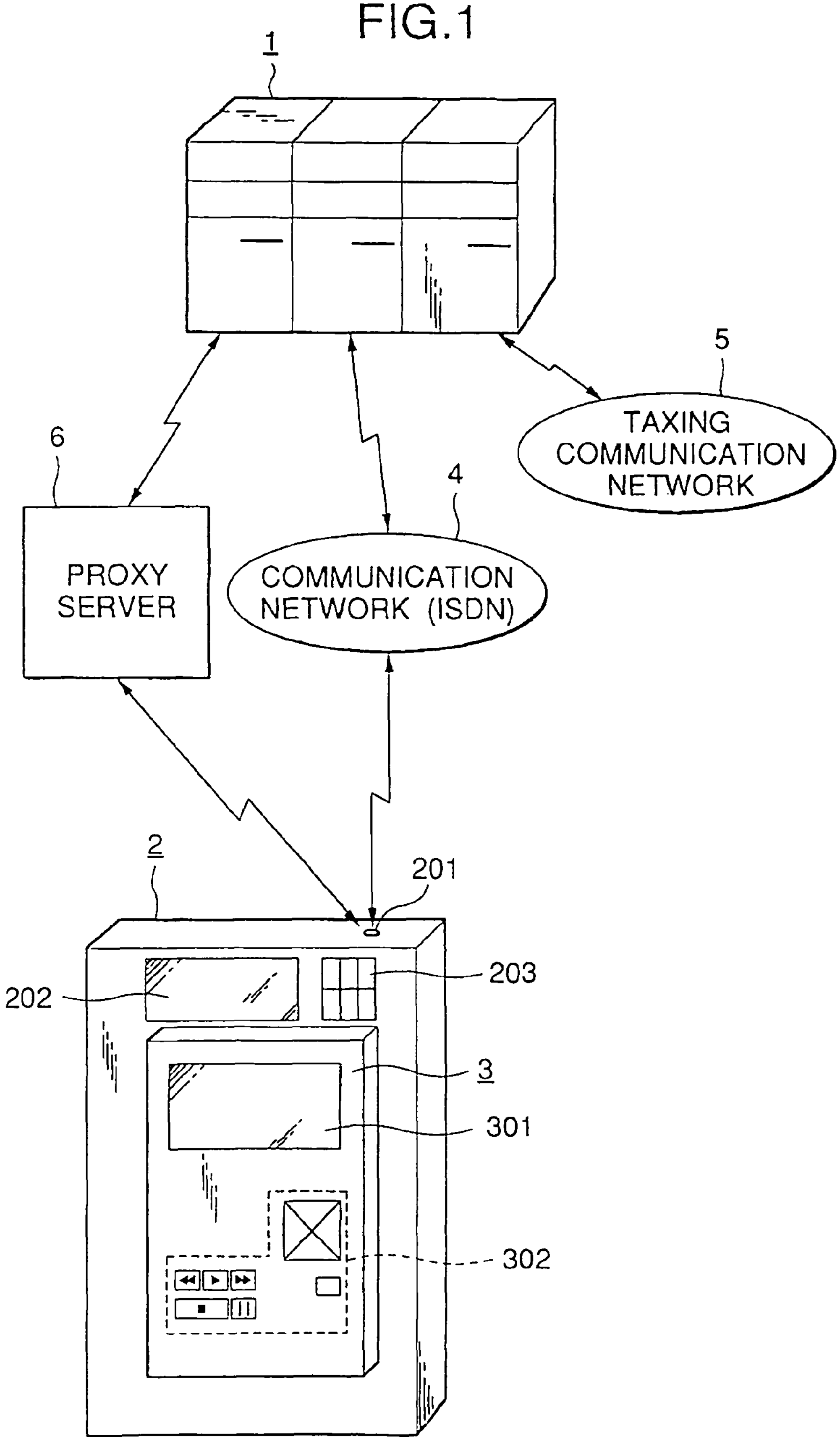
FIG. 1 is a conceptual view of an information distributing system of the present invention.
Figure 2:
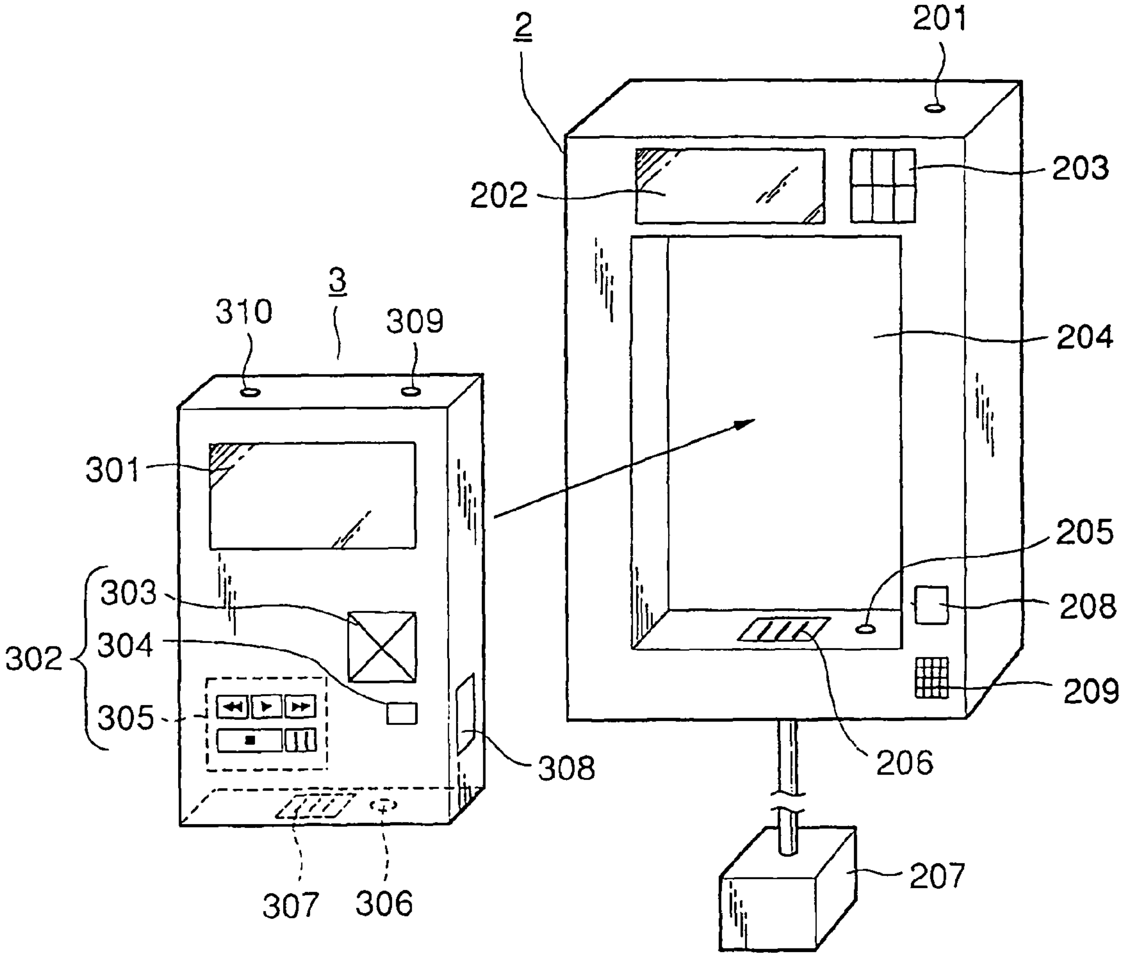
FIG. 2 is a perspective view of a portable terminal device portion and a terminal device portion of the present invention.
Figure 3:
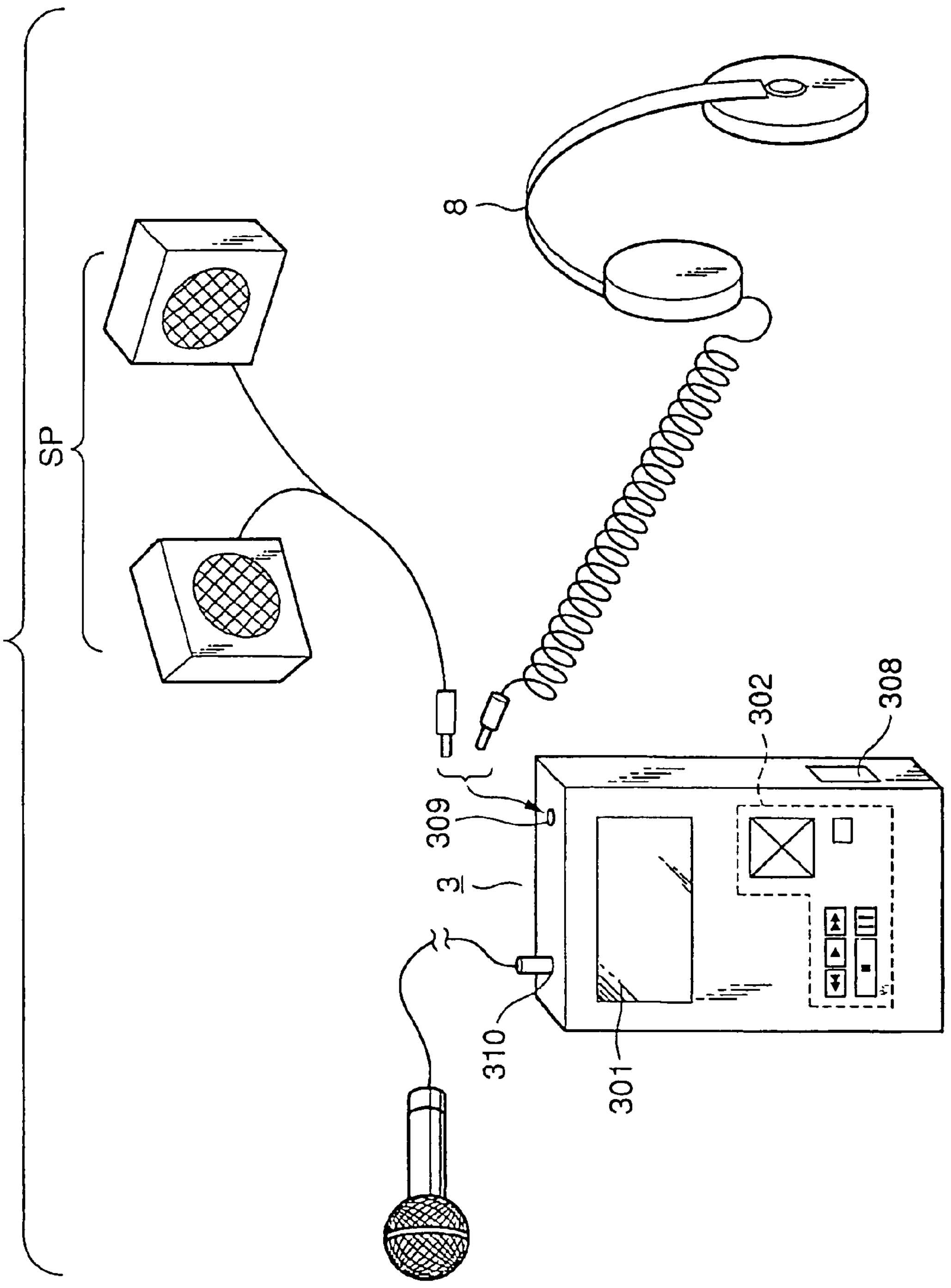
FIG. 3 is an explanatory view of a first use mode of the portable terminal device portion of the present invention.

With reference to FIGS. 1 and 2, a structural example of an information distributing system according to an embodiment of the present invention will be described. FIG. 1 shows the entire information distributing system of this embodiment, and FIG. 2 shows a portable terminal device 3 as well as a terminal mount portion 204 of a terminal device 2 among devices constituting the information distributing system.

In FIG. 1, a server 1 as an information center includes a large capacity recording medium for storing data for distribution, such as audio information, text information, picture information, and video information, and is structured such that the server can mutually communicate with a number of terminal devices 2 through a communication network 4. The server 1 receives request information transmitted from the terminal device 2 through the communication network 4, and retrieves information designated by this request information from information stored in the recording medium.

A user can generate the request information by making an operation to the terminal device 2 or the portable terminal device 3 to select desired information. The information designated by the request information is transmitted from the server 1 to the terminal device 2 through the communication network 4.

In this embodiment, the desired information to be downloaded from the server 1 through the terminal device 2 is downloaded to the terminal device 2 or the portable terminal device 3, or when the portable terminal device 3 is charged by the terminal device 2, a taxing process to a user is performed. A taxing communication network 5 for collecting a charge from a user in accordance with the taxing process is provided. This taxing communication network 5 is connected to a financial institution or the like with which each user contracts for paying a charge for using the information distributing system.

The terminal device 2 is provided in a stand at each station, a convenience store, a public telephone, each home, and the like, receives information transmitted from the server 1 by a communication control terminal 201 through the communication network 4, and outputs the received information to the portable terminal device 3.

A front panel of the terminal device 2 is provided with a terminal mount portion 204 on which the portable terminal device 3 is mounted, a display portion 202 for suitably displaying desired contents, a key operation portion 203 for a user to select desired information and to make other necessary operations, and the like.

The communication control terminal 201 disposed at the side portion of the main body is a control terminal to make mutual communication against the server 1 through the communication network 4, and the network line is drawn out.

As shown in FIG. 2, the terminal mount portion 204 is provided with an information input/output terminal 205, and a power source supply terminal 206. The power supply terminal 206 includes a switching converter and the like, and is connected to a power source portion 207 for generating DC power of a predetermined voltage from an inputted commercial AC power source and for supplying the DC power to the power supply terminal 206.

In the state where the portable terminal device 3 is mounted on the terminal mount portion 204, the information input/output terminal 205 is connected to an information input/output terminal 306 of the portable terminal device 3, and the power supply terminal 206 is connected to a power source input terminal 307 of the portable terminal device 3.

The terminal device 2 is provided with a microphone 208 and a speaker 209.

In the portable terminal device 3, as shown in FIG. 2, a display portion 301 and a key operation portion 302 are provided on the front portion of a main body.

The display portion 301 makes desired display according to the operation or action of a user performed to the key operation portion 302. The key operation portion 302 is provided with a select key 303 for selecting information requested by a user, a determination key 304 for determining the information selected by the user, an operation key 305, and the like.

The portable terminal device 3 of this embodiment can reproduce information stored in an inner recording medium. The operation key 305 is provided with a fast forward key, a rewinding key, a stop key, a temporary stop key, and the like, for performing various kinds of replay operations of information stored in the inner recording medium. The select key 303 and the determination key 304 provided on the key operation portion 302 of the portable terminal device 3 may be a so-called jog dial constituted by a rotating operator and the like. It is also appropriate that desired information is selected by a rotating operation to the jog dial and is determined by a pressing operation.

The bottom portion of the portable terminal device 3 is provided with the information input/output terminal 306 and the power source input terminal 307. When the portable terminal device 3 is mounted on the terminal mount portion 204 of the terminal device 2, the information input/output terminal 306 and the power input terminal 307 are connected to the information input/output terminal 205 and the power source supply terminal 206 of the terminal device 2, respectively. By this connection, the input/output of information becomes possible between the portable terminal device 3 and the terminal device 2. The information outputted from the terminal device 2 to the portable terminal device 3 is stored in a built-in recording medium in the portable terminal device 3. The terminal device 2 charges the portable terminal device 3 with electricity.

The upper portion of the portable terminal device 3 is provided with an audio output terminal 309 and a microphone terminal 310. A headphone 8 or an active speaker SP used when a user listens to audio information can be connected to the audio output terminal 309. The microphone terminal 310 is provided not only for information obtained by downloading information stored in the server 1 through the communication network 4, but also for the purpose of being connected by a microphone 12 when the portable terminal device 3 is used as a memo recording device for recording the voice of a user.

Figure 4:
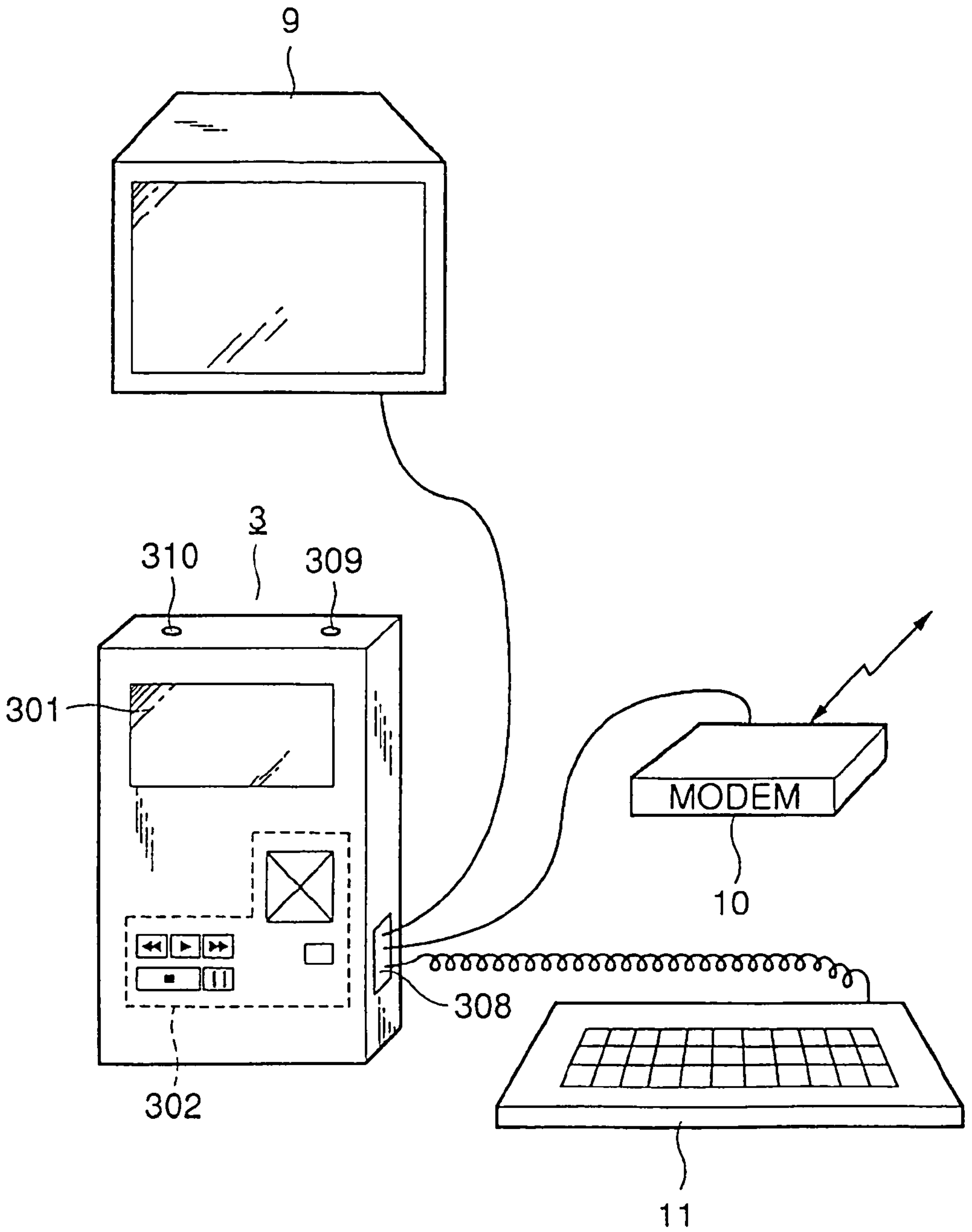
FIG. 4 is an explanatory view of a second use mode of the portable terminal device portion of the present invention.

As shown in FIG. 4, the side portion of the portable terminal device 3 is provided with a connector 308 to which an outside monitor device 9, a keyboard 11, a modem or terminal adapter 10, and the like can be connected.

The information distributing system of this embodiment is a system for realizing the so-called data-on-demand in which information selected by a user of the portable terminal device 3 among a large amount of information stored in the server 1 is downloaded to the recording medium of the portable terminal device 3.

It is also possible to modify such that the display portion 202 and the key operation portion 203 provided in the terminal device 2 are omitted to delete the functions of the terminal device 2, and instead of the omitted portions, similar operation can be made by the display portion 301 and the key operation portion 302 of the portable terminal device 3.

In FIG. 1 and FIG. 2, although such a structure is adopted that the main body of the portable terminal device 3 can be attached to and detached from the terminal device 2, since at least information input/output against the side of the terminal device 2 and power supply to the portable terminal device 3 can be made, the structure may be modified such that a power supply line and an information input/output line having a small attachment portion are extended from a prescribed position of a bottom, a side, or a top portion of the portable terminal device 3, and the small attachment portion is attached to the terminal device 2.

Since there is a possibility that plural users each having the portable terminal device 3 make access to one terminal device 2, a plurality of terminal mount portions 204 may be provided so that a plurality of portable terminal devices 3 can be mounted or connected to one terminal device 2.

The communication network 4 is not particularly limited, and for example, ISDN (Integrated services digital network), CATV (Cable Television Community Antenna Television), communications satellite, telephone line, wireless communications, or the like may be used.

The communication network 4 requires bidirectional communication, and in the case where an existing communications satellite or the like is adopted, another communication network 4 is also used to realize the bidirectional communication.

In order to transmit information directly from the server 1 to the terminal device 2 through the communication network 4, not only the cost for infrastructure, such as connection of lines from the server 1 to all the terminal devices 2, is required, but also a load may be applied to the server 1 since the request information is concentrated on only the server 1. It is also possible to modify such that, as shown in FIG. 1, a proxy server 6 for temporarily storing data is provided between the server 1 and the terminal device 2 to save the length of the line, and predetermined data are download to the proxy server 6 in advance so that information in response to request information can be downloaded by only data communication between the proxy server 6 and the terminal device 2.

The inner structure of the server 1, the terminal device 2, and the portable terminal device 3 constituting the information distributing system of this embodiment will be described with reference to a block diagram of FIG. 5. The same reference characters are designated to the same parts as those of FIGS. 1 and 2.

The server 1 will be described.

Figure 5:
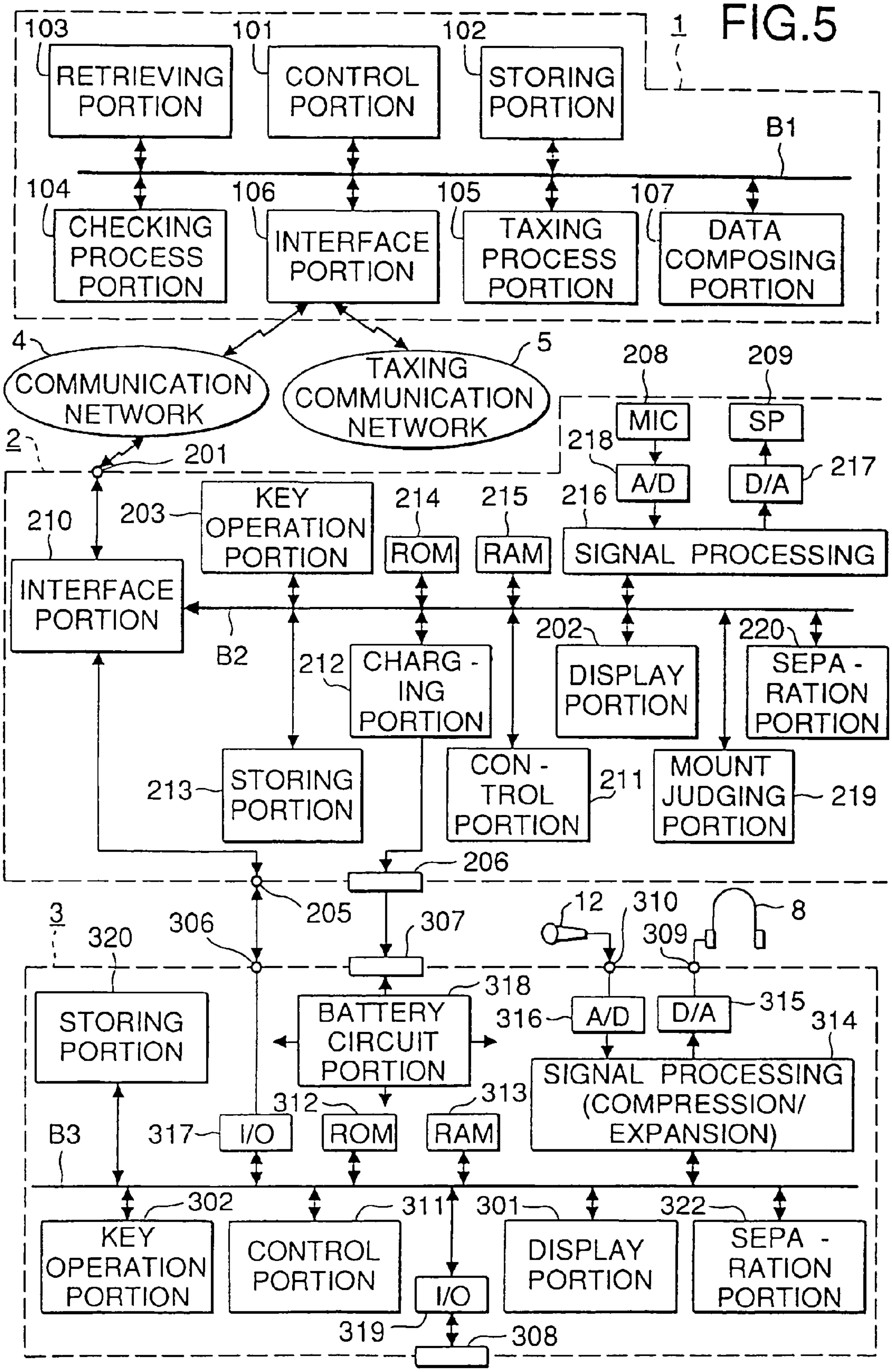
FIG. 5 is a block diagram showing the inner structure of the respective devices of the information distributing system of the present invention.

The server 1 shown in FIG. 5 includes a control portion 101, a memory portion 102, a retrieving portion 103, a checking process portion 104, a taxing process portion 105, an interface portion 106, and a data composing portion 107. These functional circuit portions are connected to each other through a bus line B1 to enable transmission and reception of data.

The control portion 101 is constituted by a microcomputer and the like, and controls the respective functional circuit portions of the server 1 in response to various kinds of information supplied from the communication network 4 through the interface portion 106.

The interface portion 106 is provided so that bidirectional communication against the terminal device 2 can be made through the communication network 4. The transmission protocol at the transmission may be a unique protocol, or may be one in which data transmission is made in a packet by TCP/IP (transmission control protocol/internet protocol) generally used in Internet, or the like.

The retrieving portion 103 is provided so that a process of retrieving desired data from data stored in the memory portion 102 is carried out by the control of the control portion 101. The retrieving process is carried out on the basis of the request information transmitted from the terminal device 2 and inputted into the control portion 101 through the communication network 4 and the interface portion 106.

The memory portion 102 includes a large capacity recording medium, a driver device for driving the recording medium, and the like. In addition to the foregoing data for distribution, information relating to a terminal ID assigned to each portable terminal device 3, and user relating data such as taxing set information are made into a database and are stored.

In this embodiment, character data and audio data corresponding to the character data can be outputted as one type of data for distribution. The audio data may be stored as audio data, or instead of storing the audio data themselves, a voice synthesizing portion for producing audio data on the basis of the character data or the like may be provided.

As the recording medium included in the memory portion 102, although a magnetic tape or the like used in a current equipment for broadcasting is conceivable, in order to realize the data-on-demand function, which is one of the features of this system, a hard disc, an IC memory, an optical disc, an optical magnetic disc, and the like, in which random access can be made, is preferable.

It is preferable that data are subjected to digital compression since the memory portion 102 is required to store a large amount of and a plurality of data. As the compression method, although various methods, such as ATRAC (adaptive transform acoustic coding), ATRAC 2, TwinVQ (transform domain weighted interleave vector quantization) (Trade Mark), are conceivable, the method is not particularly limited as long as the compression method enables expansion at the side of the terminal device 2.

The checking process portion 104 checks the terminal ID of the portable terminal device 3 transmitted together with the request information and the like against the database of terminal ID of the portable terminal device 3 which can use the information distributing system at present, and the checking result is outputted to the control portion 101. The database of the terminal ID is stored as the user relating data in the memory portion 102. On the basis of the checking result, the control portion 101 sets allowance/non-allowance of using the information distributing system to the portable terminal device 3 connected to the terminal device 2 which transmits the request information.

The taxing process portion 105 carries out a taxing process of charges corresponding to use contents of the information distributing system by a user owning the portable terminal device 3 by the control of the control portion 101. When request information for download of information or electrification is supplied to the server 1 from the terminal device 2 through the communication network 4, the control portion 101 outputs and transmits data for transmission of necessary information or for allowance of electrification in response to the request information. The control portion 101 makes control such that the taxing process portion 105 sets taxing charges in accordance with the actual use state as mentioned above.

The data composing portion 107 is provided to compose desired data retrieved by the retrieving portion 103, and in the case where character data and audio data corresponding to the character data, for example, reading data equivalent to characters of the character data are requested by the request information transmitted from the terminal device 2 and inputted into the control portion 101 from the communication network 4 through the interface 106, the character data and the audio data are composed.

In such a case that audio data of karaoke music or the like are requested, the audio data and lyric data corresponding to the audio data are composed.

The terminal device 2 will be described.

In the terminal device 2 shown in FIG. 5, a display portion 202, a key operation portion 203, an interface portion 210, a control portion 211, a charging portion 212, a memory portion 213, a ROM 214, a RAM 215, a signal processing circuit 216, a mount judging portion 219, and a separating portion 220 are connected to each other through a bus line B2.

The control portion 211 includes a microcomputer and the like, and controls the operation of the respective functional circuit portions inside the terminal device 2 as the need arises.

The interface portion 210 is provided between the communication control terminal 201 and the information input/output terminal 205, and mutual communication against the server 1, and mutual communication against the portable terminal device 3 are made possible through the communication network 4. The environment in which the server 1 can be communicated with the portable terminal device 3 can be obtained through the interface portion 210.

The memory portion 213 is constituted by a memory, a fixed kind of recording medium, its driving device, and the like, and temporarily stores the desired information transmitted from the server 1 or the portable terminal device 3. Writing and reading control to the memory portion 213 is carried out by the control portion 211.

The ROM 214 stores information, such as program data necessary for the control portion 211 to execute necessary control, and various kinds of database. The RAM 215 temporarily stores data for retrieving, processing, displaying, and the like of the information temporarily stored in the storing portion 213, or data generated by the process of the control portion 211.

The mount judging portion 219 judges the state of mounting/non-mounting of the portable terminal device 3 to the terminal mount portion 204 of the terminal device 2. The mount judging portion 219 may be structured by including a mechanism such as a photo interrupter or a mechanical switch, or may be included in the power source supply terminal 206, the information input/output terminal 205, or the like and judgement is made by a conduction state of a predetermined terminal obtained when the portable terminal device 3 is properly mounted on the terminal device 2.

In the charging portion 212, a prescribed DC voltage supplied from the power source portion 207 is supplied from the power supply terminal 206 through the power source input terminal 307 of the portable terminal device 3 to supply charging power, so that a battery of the portable terminal device 3 is charged.

The display portion 202 is provided on the main body to be exposed, and is constituted by a display device, such as a liquid crystal display or a CRT (cathode-ray tube), its display driving circuit, and the like.

The key operation portion 203 is provided with various kinds of keys as shown in FIG. 2, and operation information performed to the key operation portion 203 is supplied to the control portion 211 through the bus line B2. In the control portion 211, according to the supplied operation information, necessary control processes are suitably carried out.

In the signal processing circuit 216, audio data read from the storing portion 213 are inputted through the bus line B2 and necessary signal processing is carried out. If the audio data stored in the storing portion 213 was subjected to a compressing process of a definite format and was encoded, in the signal processing circuit 216, an expanding process and a prescribed decoding process are carried out for the inputted compressed audio data, and the processed data are outputted to the D/A converter 217. The audio data converted into analog audio signals by the D/A converter 217 are outputted as sound through the speaker 209.

The microphone 208 is provided to the terminal device 2, and when sound is put into the microphone 208, the sound signal is converted into a digital audio signal through the A/D converter 218 and is inputted into the signal processing circuit 216.

In the signal processing circuit 216, with respect to the inputted digital audio signal, a compressing process and an encoding process suitable for data writing into the memory portion 213 are carried out. The encoded data are stored in the memory portion 213 by the control of the control portion 211. Alternatively, the data can also be directly outputted from the audio output system of the signal processing circuit 216 through the D/A converter 217 from the speaker 209.

In the separating portion 220, in the case where data supplied through the interface portion 210 are composite data of the audio data and the character data, the audio data and the character data are separated.

The input/output of sound is carried out by only the side of the portable terminal device 3, and it is not necessary to mount the signal processing circuit 216, the D/A converter 217, the microphone 208, the speaker 209, the A/D converter 218, and the separating portion 220 in the terminal device 2.

The portable terminal device 3 will be described.

The portable terminal device 3 shown in FIG. 5 is mounted on the terminal device 2, so that the portable terminal device is connected to the terminal device 2 so as to enable data communication through the information input/output terminals 205 and 306, and power is supplied from the power source supply portion 207 of the terminal device 2 through the power source supply terminal 206 and the power source input terminal 307.

The portable terminal device 3 includes a display portion 301, a key operation portion 302, a control portion 311, a ROM 312, a RAM 313, a signal processing circuit 314, I/O ports 317 and 319, a storing portion 320, and a separating portion 322, and the respective functional circuit portions are connected to each other through a bus line B3.

The control portion 311 is composed of a microcomputer and the like, and controls the operation of the respective functional circuit portions in the portable terminal device 3.

The ROM 312 stores information, such as program data necessary for the control portion 311 to execute a required control process and various kinds of database. The RAM 313 temporarily stores required data to be communicated with the terminal device 2, or data generated by the process of the control portion 311.

The I/O port 317 is provided to make mutual communication between the portable terminal device 3 and the terminal device 2 through the information input/output terminal 306. The request information transmitted from the portable terminal device 3 or the data downloaded to the portable terminal device 3 are inputted and outputted through the I/O port 317.

The memory portion 320 provided on the portable terminal device 3 includes a prescribed memory medium, a driver for carrying out recording and reproducing to the memory medium, and the like, and the information downloaded from the server 1 through the terminal device 2 is stored in the prescribed memory medium.

Although the memory medium adopted in the memory portion 320 is not particularly limited, in view of the properties of random access, it is preferable to adopt a memory medium in which random access can be made, such as a hard disc, an optical disc, an optical magnetic disc, and an IC memory.

Among data including download information stored in the memory portion 320, the audio data are reproduced and outputted by the portable terminal device 3. For the reproduction and output, the signal processing circuit 314 is provided in the portable terminal device 3. In the signal processing circuit 314, the audio data read out of the memory portion 320 are inputted through the bus line B3 and a required signal processing is carried out. If the audio data stored in the memory portion 320 were subjected to a compression process in accordance with a designated format and was subjected to designated encoding, then in the signal processing circuit 314, the inputted compressed audio data are subjected to an expanding process and a designated decoding process, and the processed data are outputted to the D/A converter 315. The audio data converted into analog audio signals by the D/A converter 315 are supplied to the audio output terminal 309. FIG. 5 shows the state in which the headphone 8 is connected to the audio output terminal 309.

In the case where the information in which audio data and character data are composed by the data composing portion 107 of the server 1 is supplied as described above, the audio data and the character data are separated by the separating portion 322. The separated audio data and character data are stored in the memory portion 320 and are outputted from the display portion 301, the headphone 8, or the like.

It is also possible to make modification such that the audio data and the character data are stored in the memory portion 320 in the state where both types of data are composed, and both types of data are separated by the separating portion 322 when the audio data and the character data are outputted.

The portable terminal device 3 is provided with the microphone terminal 310. If the microphone 12 is connected to the microphone terminal 310 and sound is recorded, the sound signal is converted into a digital audio signal through the A/D converter 316 and is inputted into the signal processing circuit 314. In the signal processing circuit 314, the inputted digital audio signal is subjected to a compressing process and a required encoding process suitable for data writing into the memory portion 320. The encoded data are stored in the memory portion 320 by the control of the control portion 311. Alternatively, the data can be directly outputted from the audio output system of the signal processing circuit 314 through the D/A converter 315 to the audio output terminal 309. A user of the portable terminal device 3 can use the device as a memo recording device which records the voice of a user instead of recording characters on a memo pad.

The battery circuit portion 318 included in the portable terminal device 3 includes at least a battery, and a power source circuit for supplying operation power of the respective functional circuit portions in the portable terminal device 3 by the power of the battery. In the state where the portable terminal device 3 is mounted on the terminal device 2, the operation power and charging power for the circuits of the portable terminal device 3 are supplied from the charging portion 212 to the battery circuit portion 318 through the power supply terminal 206 and the power source input terminal 307.

The display portion 301 and the key operation portion 302 of the portable terminal device 3 are provided on the main body as shown in FIG. 2, and display control to the display portion 301 is carried out by the control portion 311. The character data downloaded and stored in the memory portion 320 can be displayed on the display portion 301. The control portion 311 executes a suitable required control process on the basis of operation information outputted from the key operation portion 302.

In this embodiment, the information transmitted from the server 1 is once downloaded to the terminal device 2 and the portable terminal device 3, and after the information is stored in the memory portion 320 of the terminal device 3, it is read and outputted. However, it is also possible to operate such that the information is not stored anywhere, but it is directly transmitted to the signal processing portion 314 and expanded. For example, the audio data are converted into analog information by the D/A converter 315, and outputted from the headphone speaker 8.

The I/O port 319 is provided to enable input/output between an equipment or device connected by the connector 308 and the portable information terminal. As shown in FIG. 4, the connector 38 can be connected to the monitor device 9, the modem or terminal adapter 10, and the keyboard 11. When the monitor device 9 is connected, it becomes possible to output animated data, character data, and the like downloaded to the portable terminal device 3 on a large screen. As the monitor device 9, a CRT, a TFT liquid crystal, a plasma display, and the like are conceivable, and in a head mount type liquid crystal display, even if a user is moving, the user can see the output information.

The keyboard 11 is connected to the portable terminal device 3 so that selection of desired information by a user is made easy, and more complicated command input becomes possible. Since it becomes easy for a user to input a statement, information, or the like as character information, if the user information is uploaded to the server 1, it is possible to provide a meeting room or the like as a place where user's requests are collected or information is exchanged among users.

When the modem or terminal adapter 10 is connected to the portable terminal device 3, direct data communication to the server 1 without the terminal device 2 becomes possible. Further, since communication to other computers or portable terminal devices 3 becomes possible, data exchange among users can be easily carried out. When the device is used together with a portable telephone and the like, the request information can be transmitted to the server 1 at any time and any place, and desired data are downloaded.

It is also easy to wireless-connect the server 1 to the portable terminal device 3 by a wireless connection controller.

The total operation of the information distributing system of the embodiment structured as described above will be described.

A user selects desired information from the data base menu of the server 1, which is stored in the ROM 312 or the RAM 313, by the key operation portion 302 of the portable terminal device 3. The request information indicates the selected information is stored in the RAM 313. Character data, audio data reading the character data, or composite data of the character data and the audio data are selected by the key operation portion 302, so that the request information is prepared.

When the portable terminal device 3 is mounted on the mount portion 204 of the terminal device 2 in the state where the request information is prepared, the terminal device 2 is connected to the server 1 through the interface portion 210 and the communication network 4, and is connected to the portable terminal device 3 through the same interface portion 210 and the I/O port 317 of the portable terminal device 3.

The request information stored in the RAM 313 is controlled by the control portion 311 connected to the common bus, and is automatically transmitted to the terminal device 2 through the I/O port 317, and is further transmitted to the server 1 through the interface portion 210.

In the server 1, the request information is inputted from the interface portion 106, data corresponding to the request information are retrieved from the memory portion 102 by the retrieving portion 103, and the retrieved data are transmitted to the terminal device 2.

The ID information and the like included in the request information is recognized, and checking whether the user can use the service is carried out in the checking process portion 104 at the same time.

Further, according to the kind, the number, and the like of the data requested by the request information, the taxing process portion 105 performs a taxing process to a user's account of the taxing communication network 5 connected to the interface portion 106.

In the server 1, some of data retrieved by the memory portion 102 are composed by the data composing portion 107 and are transmitted to the terminal device 2.

The data required by a user is transmitted from the server 1 to the terminal device 2 through the interface portions 106 and 210. As described above, the terminal device 2 temporarily stores the downloaded data in the memory portion 213, and is further provided with a structure of a general computer including the ROM 214, the RAM 215, and the key operation portion 203 for retrieving, processing, and displaying the information.

The data are transmitted from the interface portion 210 to the I/O port 317 of the portable terminal device 3. A time between the transmission of the request information from the portable terminal device 3 to the server 1 and the reception of desired information is used, and when the portable terminal device 3 is mounted on the terminal device 2, the power supply terminal 206 and the power source input terminal 307 at the side of the portable terminal device are connected to each other so that automatic charging to the battery 318 incorporated in the portable terminal is carried out from the charging portion 212 at the side of the terminal device 2.

In the data inputted to the portable terminal device 3 from the I/O port 317, a decomposing process of packet data is carried out, so that necessary compression information is extracted and is stored in the memory portion 320. When downloading of desired data is ended, download end display is made on the display portion 202 provided in the terminal device 2 or the display portion 301 provided in the portable terminal device 3. After a user confirms the download end display, the portable terminal device 3 is removed from the terminal device 2 so that it becomes in a state where it can be freely carried.

In the case where a user desires to reproduce the data downloaded to the portable terminal device 3, the user selects and determines data to be reproduced from a data list stored in the memory portion 320 with the key operation portion 302.

The compressed data corresponding to the desired data are read from the memory portion 320, are sent to the signal processing portion 314, and are expanded. The expanded data are converted into analog information by the D/A converter 315 and are outputted from the headphone speaker 8. When the compressed data are composite information, the composite data are separated by the separating portion 322.

For the purpose of storing the input audio signal from the microphone 12, a recording signal is outputted from the key operation portion 302, the input audio signal from the microphone 12 is digitized by the A/D converter 316, is further compressed by the prescribed compression method by the signal processing portion 314, and is recorded in the memory portion 320 through the bus. The portable terminal device 3 can be used, instead of a memo pad, as a memo recording device for simply recording voice.

Processing operations at the side of the server 1 and processing operations at the side of the information processing terminal device, that is, at the terminal device 2 and the portable terminal device 3 will be described with reference to FIGS. 6, 7 and 8.

Figures 6, 7:
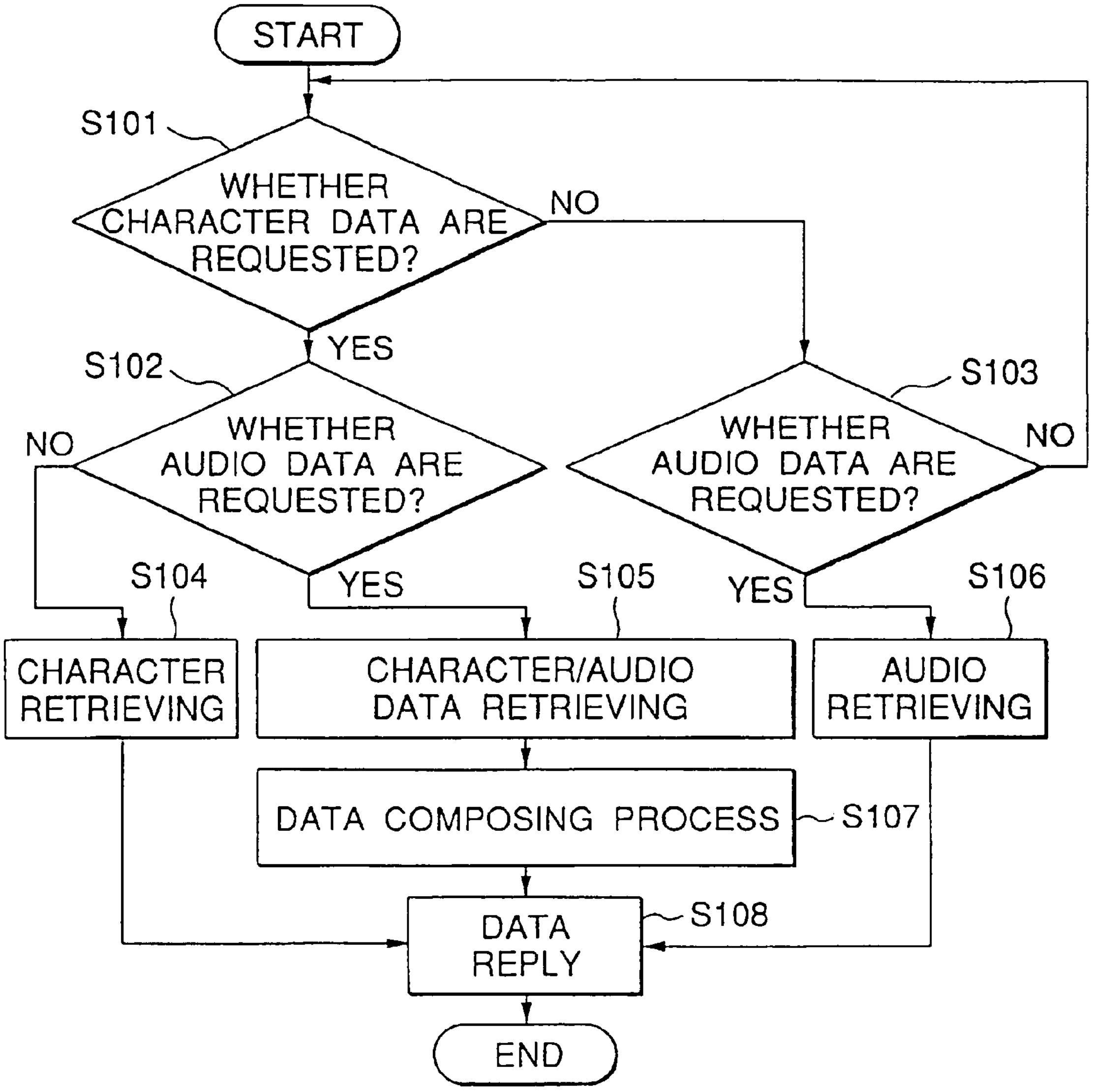
FIG. 6 is a flowchart showing a processing operation at a server side in the information distributing system of the present invention.
FIG. 7 is a table diagram of a retrieving table stored in a retrieving portion of a server in the information distributing system of the present invention.

FIG. 6 is a flowchart showing an example of processing operations at the side of the server 1.

In the control portion 101 of the server 1, when request information is transmitted from the portable terminal device 3 or the terminal device 2 through the communication network 4, at step S101, the existence of request for character data is judged from the transmitted request information, and if there is a request for character data, the process proceeds to step S102, and if there is no request for character data, the process proceeds to step S103.

At step S102, the existence of request for audio data is judged from the request information, and if there is a request for audio data, the process proceeds to step S105, and if there is no request, the process proceeds to step S104.

Also at step S103, the existence of request for audio data is judged from the request information, and if there is a request for audio data, the process proceeds to step S106, and if there is no request, the process returns to step S101.

When there is only a request for character data from the terminal device 2 or the portable terminal device 3 to the server 1, the process proceeds to step S104, when there is a request for character data and audio data, the process proceeds to step S105, and when there is only a request for audio data, the process proceeds to step S106.

At step S104, retrieving of the requested character data is carried out by the retrieving portion 103, the process proceeds to step S108, and at step S108; the character data are transmitted to the terminal device 2 or the portable terminal device 3 through the communication network 4.

At step S105, retrieving of the requested character data and audio data is carried out by the retrieving portion 103, and the process proceeds to step S107. At step S107, the retrieved character data and audio data are composed and the process proceeds to step S108. At step S108, the composed character data and audio data are transmitted to the terminal device 2 or the portable terminal device 3 through the communication network 4. In this embodiment, in the case where the audio data and character data are required, at step S107, the character data and the audio data are composed and are downloaded. However, it is not necessary to compose the audio data and character data, but they may be separately transmitted to the terminal device 2 and the portable terminal device 3.

At step S106, retrieving of the requested audio data is carried out by the retrieving portion 103, and the process proceeds to step S108, and at step S108, the audio data is transmitted to the terminal device 2 or the portable terminal device 3 through the communication network 4.

As shown in FIG. 7, a table 400 as to character data 401 and audio data 402 is stored in the retrieving portion 103, and in the table 400, an ID of requested data, and addresses of the character data and audio data of the data in the memory portion 102, such as character data "A" address and audio data "a" address, are arranged as a pair. The address of the memory portion 102 corresponding to the ID of the requested data is accessed and, the information is read out of the address of the specified memory portion 102 so that desired information is retrieved.

Figure 8:
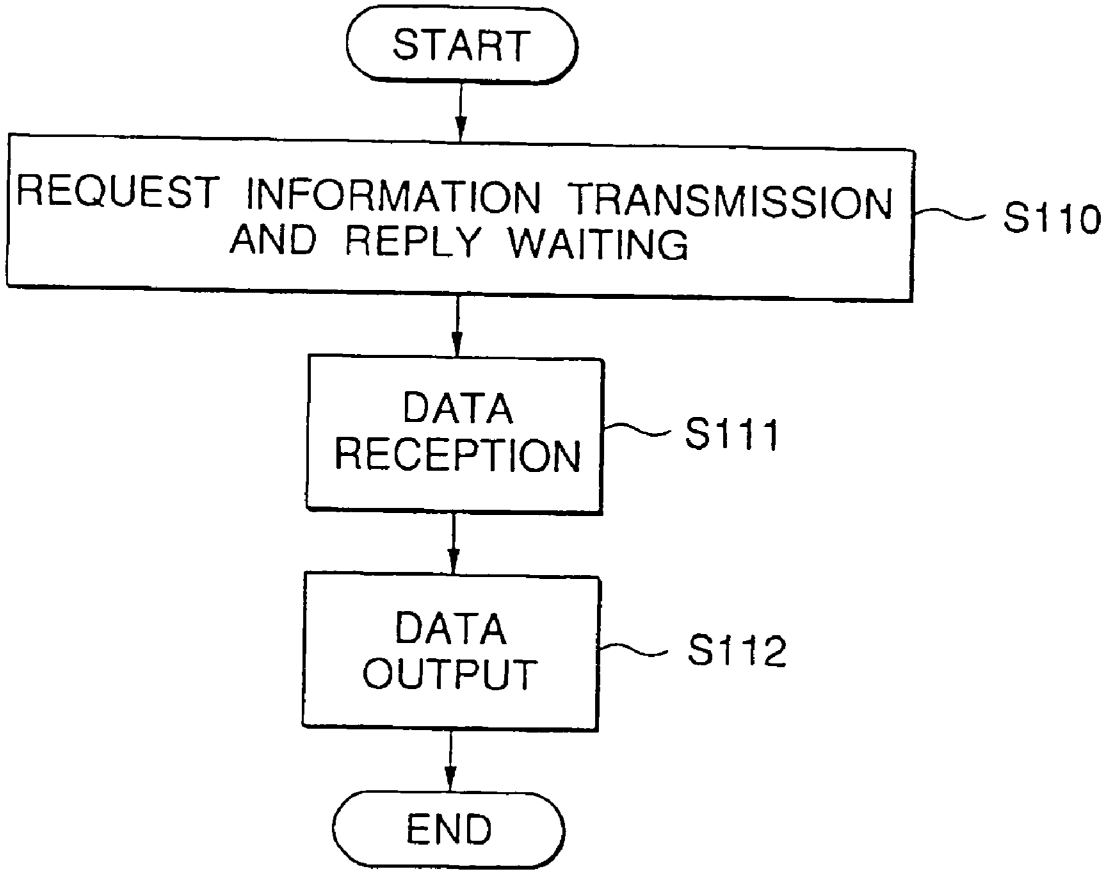
FIG. 8 is a flowchart showing a processing operation at an information processing terminal device side in the information distributing system of the present invention.

FIG. 8 is a flowchart showing an example of processing operations at the side of the information processing terminal device, and when requested information is transmitted from the portable terminal device 3 to the server 1 through the communication network 4, the control portion 311 of the portable A terminal device 3 is in a reply waiting state (S110) of data from the server 1, which corresponds to the request information. When the designated data are transmitted from the server 1, the process proceeds to step S111, the transmitted data are received, and are stored in the memory portion 320. At step S112, control is made so that the received/stored data are outputted.

When the transmitted data are composite data of character data and audio data, after the data are separated into the audio data and the character data by the separating portion 322 of the portable terminal device 3, the character data are displayed and outputted by the display portion 301. The audio data is subjected to a predetermined process by the signal processing portion 314, and an audio output is made from the headphone 8 through the D/A converter 315 and the audio output terminal 309.

Although it is designed such that the audio data and the character data are transmitted as the composite data from the server 1, they may be separately downloaded.

It is also possible to have a design such that the download character data are outputted from the display portion 202 of the terminal device 2, and the audio data are outputted from the speaker 209.

If the transmitted data are only the character data, the data are displayed from the display portion 202 of the terminal device 2 or the display portion 301 of the portable terminal device 3, and if the data are only the audio data, sound output is made from the speaker 209 of the terminal device 2 or the headphone 8 of the portable terminal device 3.

The character data and/or audio data in the terminal device 2 or the portable terminal device 3 can be selected by a pointing device, a finger, or a keyboard. In the terminal device 2 or the portable terminal device 3, it is designed such that request information including ID information of a user is prepared on the basis of the data desired by the user, and is transmitted to the server 1.

In the information distributing system of this embodiment, since both of audio data and character data, the audio data, or the character data are separately downloaded, when the desired data of a user are data, such as a novel, a newspaper, a magazine, or news, one of the character data and the audio data, or both data are selected and downloaded. When the communication line is crowded, it is possible to select such that only one data are downloaded, so that a wasteful time in information collection can be eliminated in the terminal device 2 or the portable terminal device 3, effective information collection becomes possible, and speed-up of information collection can be made.

Figure 9:
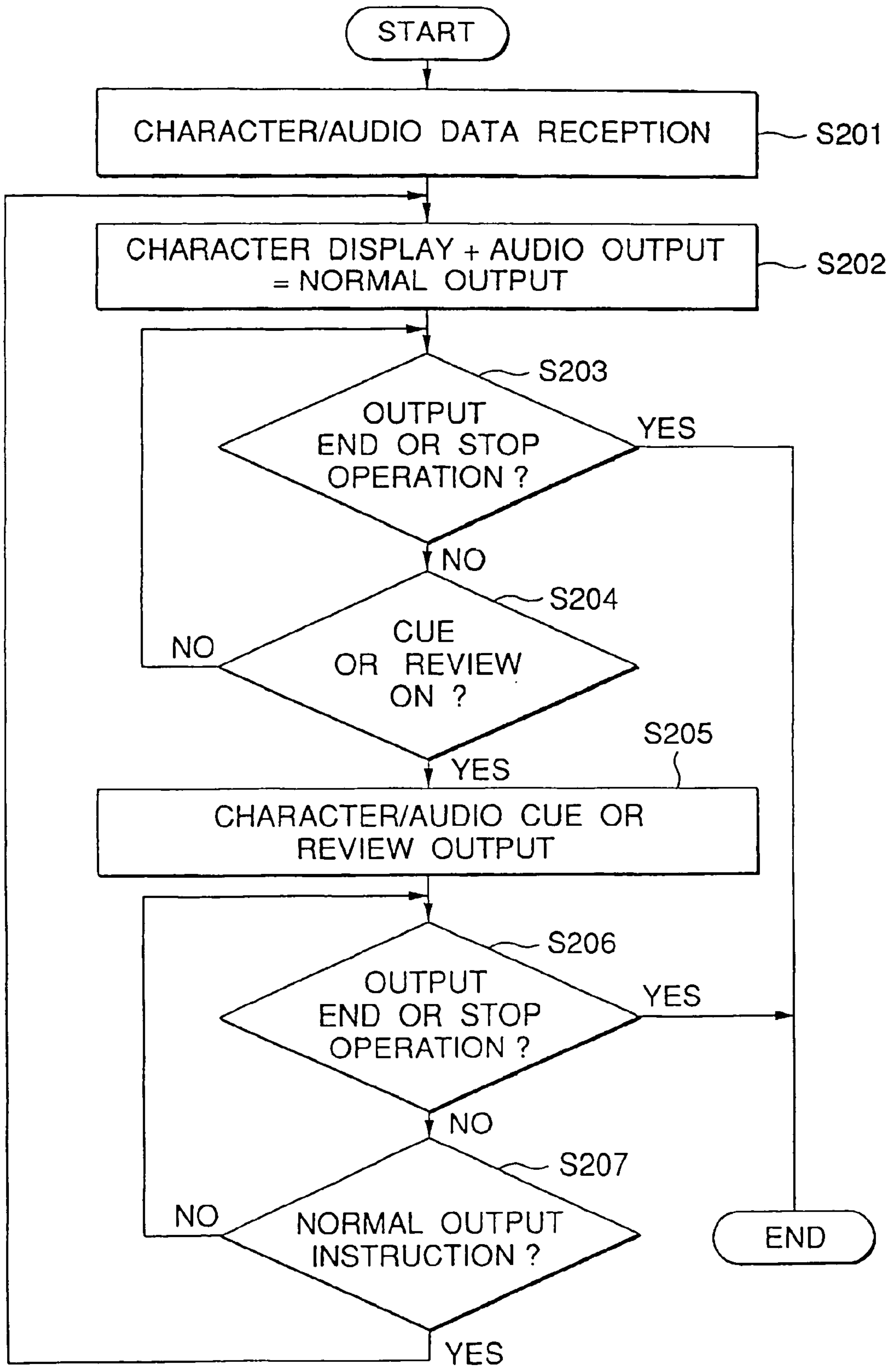
FIG. 9 is a flowchart showing a detailed processing operation at the information processing terminal device side in the information distributing system of the present invention.

FIG. 9 is a flowchart showing an example of specific processing operations at the side of the portable terminal device 3 in the case where character data and audio data are distributed in the information distributing system of this embodiment. The operations described below can also be executed similarly in the terminal device 2.

In the control portion 311 of the portable terminal device 3, at step S201, the audio data and character data downloaded from the server 1 through the communication network 4 are received. Since the received audio data and character data are not limited to composite data, the explanation of a separating process will be omitted.

The received audio data are outputted from the headphone 8 of the portable terminal device 3, and the character data are displayed and outputted from the display portion 301 of the portable terminal device 3.

A method of outputting the audio data from the headphone 8 corresponding to the display of character data will be briefly described.

Figure 10:
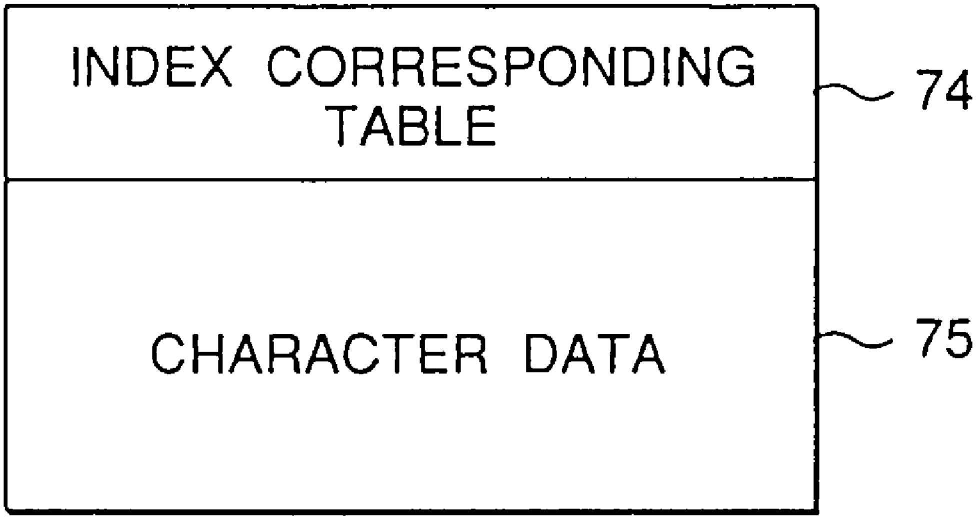
FIG. 10 is an explanatory view for explaining the structure of character data distributed by the information distributing system of the present invention.

The data structure of the character data are made up of an index corresponding table 74 and a character data main body 75 as shown in FIG. 10, and the character data are displayed on the display portion 301 of the portable terminal device 3. Page feeding, line feeding, and the like can also be made by the operation key 305 of the key operation portion 302. In the index corresponding table, indexes in a page unit, a line unit, a character unit, and the like are provided, and addresses of character data corresponding to a designated page, line, and character are stored, and further, addresses of audio data corresponding to the page, line, and character are stored.

At step S202, the address of the audio data corresponding to the displayed character data is extracted from the index corresponding table and the audio data at the extracted address position are read, so that the character data and the audio data corresponding to the character data are outputted as normal output while synchronization between the character data and the audio data is taken. In the above method, a buffer for temporarily storing the received audio data may be provided separately from the memory portion 320.

In this embodiment, although the synchronization is taken by using the index corresponding table, a synchronous signal for synchronous output may be superimposed on the character data and the audio data.

At steps S203 and S204, the operation of a user or the output state are monitored. When a stop operation is made by a user, or output of data to be outputted is ended, the operation of the portable terminal device 3 is ended.

When a user operates a fast forward key or a rewinding key of the key operation portion 302, that is, a cue or review instruction operation exists at step S204, the speed of scroll of character data is changed at step S205, cue or review display is made, and synchronously with the character display, the audio output is controlled to be outputted in cue or review output. The pitch of the audio output is changed so that the cue or review output can be realized.

When the cue or review output is executed, at steps S206 and S207, the operation of a user and the output state are monitored. When the user makes a stop operation, or output of all data to be outputted is ended, the operation of the portable terminal device 3 is ended.

When a user makes instructions to return the cue or review display to the normal output of display and output at a normal speed, the process proceeds from step S207 to step S202, and the display returns to the normal output.

In the portable terminal device 3 of this embodiment, since the cue or review display and output can be freely made, the time of collecting information can be further shortened. As mentioned above, similar operation is possible also in the terminal device 2.

When desired data are retrieved from a large amount of character data, there is a case where data are retrieved more quickly by retrieving power of hearing than retrieving by seeing.

The further improvement in information retrieving and the shortening of information collecting time can be made by such a method that when character data are extracted from sound through the cue display and output of the terminal device 2 or the portable terminal device 3, the output is changed into a normal output, and retrieving is again made for the character data display to limit the data.

Figure 11:
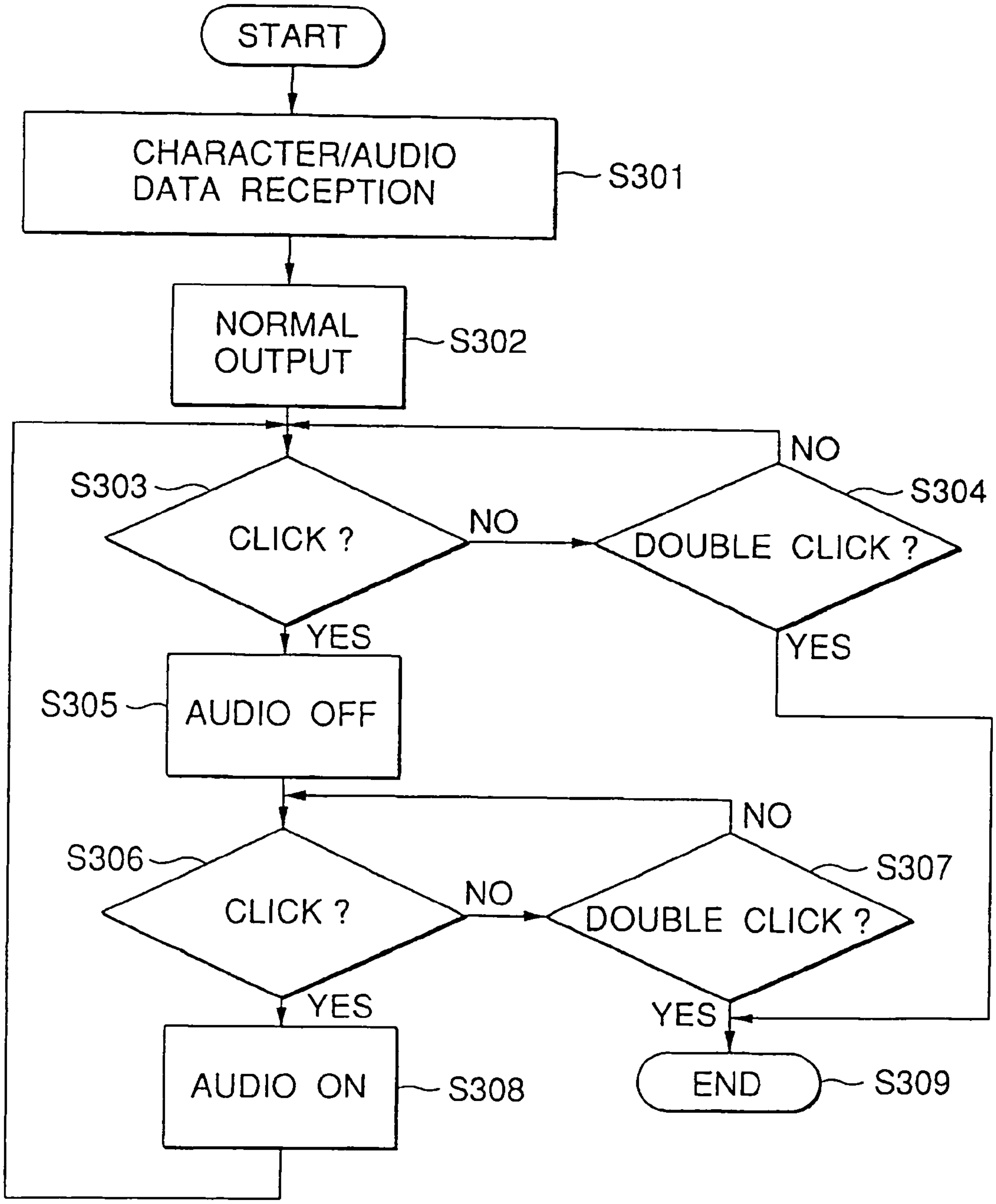
FIG. 11 is a flowchart showing another detailed processing operation at the information processing terminal device side in the information distributing system of the present invention.

FIG. 11 is a flowchart showing another example of specific process operations at the side of the portable terminal device 3 in the case where character data and audio data are distributed by the information distributing system of this embodiment. The terminal device 2 can also similarly perform this operation.

At step 301, when both character data and audio data are received by the portable terminal device 3, characters of the character data are displayed on the display portion 301 similarly to FIG. 9, and sounds of the audio data of the read character data are outputted from the headphone 8. Since the received audio data and character data are not limited to composite information, the explanation of a separating process will be omitted.

At step S302, by the above described method, the character data and the audio data corresponding to the character data are normally outputted while synchronization between the character data and the audio data is taken.

When a user clicks once the operation key 305 provided on the key operation portion 302 (S303), the process proceeds to step 305, and control is made so that the audio output is turned OFF by the control portion 311 of the potable terminal device 3. When the operation key 305 of the key operation portion 302 is again clicked once in the state where the audio output is in the OFF state, the process proceeds to step S308, control is made so that the audio output is again turned ON, and the process returns to step S303.

At the normal output when the audio data and character data are synchronously outputted, or when the audio data are turned OFF, if the operation key 305 of the key operation portion 302 is double clicked by a user, the process proceeds to step S304 or S307, and the process is ended.

In this embodiment, although the change of on/off of audio output or muting of audio output is carried out by one clicking or double clicking of the operation key 305 of the key operation portion 302, an on/off changing switch of audio output or a switch for muting audio output may be provided, respectively.

In the information processing terminal device of this embodiment, the simultaneous output of character data and audio data downloaded from the server 1 and muting of the audio output are made possible. When a user desires to read information quickly, the audio output is muted so that information collection can be made from only the character data.

In the case where a user is tired and it is hard to read characters, audio data is turned ON so that information collection can be made audibly even if the user is closing the eyes.

Most effective information collection according to the user's physical condition is possible.

In the above embodiments, although the character data are data such as an electronic publication, and the audio data are reading data of the character data, the audio data may be music audio data or karaoke audio data, and the character data may be lyric data. In this case, according to the circumstances of a user, only music, only lyrics, or both the music and lyrics are selected and downloaded.

What is claimed is:

1. A method for using a portable information processing terminal device including an audio output and a display, comprising the steps of:

downloading character data to the device;

downloading separately to the device audio data corresponding to the character data;

linking using the device the downloaded audio data and the character data;

outputting in synchronization from the device audible sound representing the audio data using the audio output and a visual representation of the character data using the display.

2. The method of claim 1, wherein the character data represents the text of a novel, a newspaper, or a magazine.

* * * * *